Figure 1:
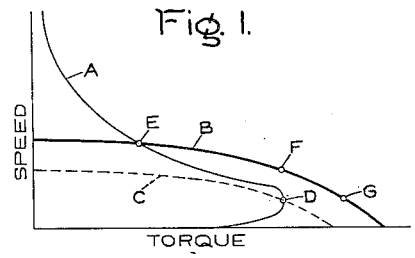

March 22, 1932.  W. SEIZ  1,850,776

METHOD OF OPERATING ALTERNATING CURRENT COMMUTATOR MOTORS

Filed Aug. 1, 1929

Inventor:
Walter Seiz,
by Charles E. Tullar
His Attorney.

Patented Mar. 22, 1932

1,850,776

UNITED STATES PATENT OFFICE

WALTER SEIZ, OF BADEN, SWITZERLAND, ASSIGNOR TO GENERAL ELECTRIC COMPANY, A CORPORATION OF NEW YORK

METHOD OF OPERATING ALTERNATING CURRENT COMMUTATOR MOTORS

Application filed August 1, 1929, Serial No. 382,734, and in Germany August 4, 1928.

The principal object of my invention is a novel method of operating alternating current dynamo electric machines having a commutated winding. Another object of my invention is to provide a simple circuit arrangement and a brush shifting mechanism for an alternating current commutator motor whereby it may be quickly changed from a motor operating with series characteristics to a motor operating with shunt characteristics and vice versa, and also to limit the current impulses to low values during the change-over period.

It is pertinent at this point to describe what are series characteristics and shunt characteristics. The following theoretical discussion is well known to those skilled in the art and will be of assistance in understanding the necessity for and the advantages of my invention. Disregarding armature reaction and saturation, the torque of a direct current motor varies directly in proportion to the strength of its magnetic field and the value of its armature current. A direct current shunt motor has its field and armature connected in parallel to the source of supply and therefore the strength of its magnetic field remains constant and its torque will vary directly in proportion to its armature current. A direct current series motor has its field connected in series with its armature and therefore the strength of its magnetic field increases in direct proportion to the armature current and its torque will vary directly as the square of the armature current. As the starting current of a motor is usually higher than its normal running current therefore a series motor will have a higher starting torque than a shunt motor of a similar rating and similar starting current.

The armature current of a direct current motor is determined by the effective voltage applied to it. The effective voltage is equal to the impressed line voltage minus the counter electromotive voltage, the latter being the voltage produced by the motor acting as a generator and it varies approximately in direct proportion to the strength of the magnetic field and the speed. Assuming the impressed line voltage and armature resistance as remaining constant, the armature current will be governed solely by the counter electromotive force and as hereinafter described this factor automatically varies to increase or decrease the armature current as the load is increased or decreased. If the load on a direct current shunt or series motor is increased, its speed will drop to lower the counter electromotive force so that the resulting effective voltage will cause a current to flow through the armature sufficient to maintain the higher load, and if the load is decreased the reverse will be true. As previously described the strength of the magnetic field of a shunt motor is independent of the armature current and hence remains constant, whereas in a series motor the strength of the magnetic field is directly proportional to the armature current. It is therefore evident that with similarly rated motors and with similar load changes a direct current series motor will have a greater speed change than a direct current shunt motor of similar rating. The characteristics I described as possessed by a direct current series motor are defined as series characteristics and those characteristics possessed by a direct current shunt motor are defined as shunt characteristics and to these definitions I will adhere throughout this application.

The principles described regarding torque and speed of direct current series or shunt motors are substantially applicable to alternating current commutator motors. Disregarding armature reaction and saturation, if for example, in an alternating current commutator motor the primary is so connected that its magnetic flux varies approximately in direct proportion to the secondary current, then the motor will have series characteristics. Similarly, for example, if in an alternating current commutator motor the primary is so connected that its magnetic flux is independent of the secondary current, then the motor will have shunt characteristics.

In industry there exists a large amount of apparatus that require a relatively large effort to start them into motion as compared to the effort necessary to keep them in motion when they have attained their running speed.

These types of apparatus should be operated or at least started by a motor having series characteristics. Where only alternating current is available these types of apparatus can be operated by alternating current commutator motors having series characteristics and under the usual operating conditions this is satisfactory. There are however many cases where the speed of the apparatus should be decreased considerably to suit the various conditions or processes. For example, if the decrease in speed is carried far enough the motor will become unstable in its operation even though the load be constant, this being the characteristic of an alternating current commutator motor operating with series characteristics. By shifting the brushes of the motor in the proper direction, stability will be obtained but with a further decrease in speed instability will again result. When the point of unstable operation is reached it becomes necessary to continually shift the brushes as the speed is lowered if stability of operation is to be obtained. It is evident that this is an objectionable feature and it therefore becomes desirable that when the point of instability is reached the motor should have stable operating characteristics. This desirable result my invention accomplishes by providing a novel and simple method of operation whereby the motor may be quickly changed from a motor having series characteristics to a motor having shunt characteristics. The alternating current commutator motor with shunt characteristics has stable operation at all speeds and therefore my invention combines the advantages of both characteristics. Where voltage changing means are employed between the supply circuit and the motor it is more economical to use the same voltage changing means in both the series and shunt characteristic operating conditions. This desirable result my invention accomplishes by means of a novel and simple circuit arrangement whereby the motor may be quickly changed from operation with series characteristics to operation with shunt characteristics and vice versa, and in which I prefer to employ the same voltage changing means in both operating conditions.

My invention will be best understood from the following description when considered in connection with the accompanying drawings while the features of my invention which are believed to be novel and patentable are pointed out in the claims appended hereto.

Figure 2:
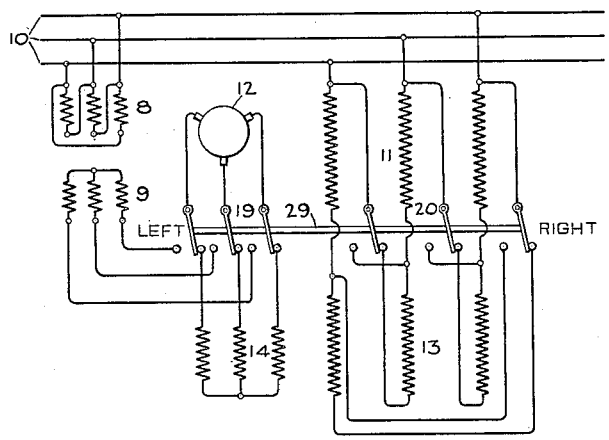
Figure 3:
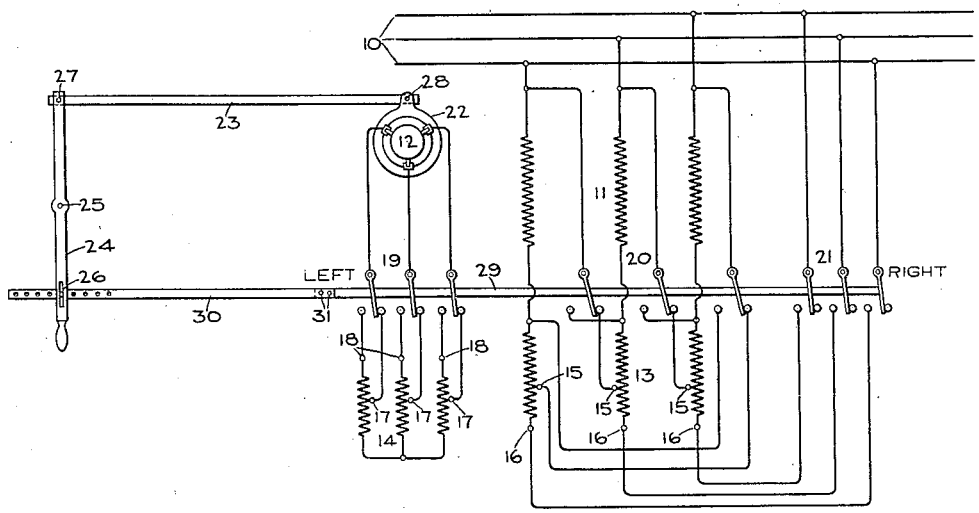

Fig. 1 represents typical speed torque curves of an alternating current commutator motor when operated with series or shunt characteristics. Fig. 2 represents the circuit connections of a three-phase alternating current commutator motor operated in accordance with my novel method of operation. Fig. 3 represents the circuit connections of a three-phase alternating current commutator motor operated in accordance with my novel method of operation and in which the same voltage changing means are employed in both operating conditions. Fig. 3 also represents a brush shifting mechanism for moving the brushes. Any suitable voltage changing means may be employed between the supply lines and the motor but for illustrative purposes I have in Figs. 2 and 3 represented such voltage changing means by transformers.

Referring to Fig. 1, A and B respectively represent typical speed torque curves of the motor when operating with series and shunt characteristics at the same brush position; C represents the speed torque curve of the motor operating with shunt characteristics at a different brush position; D represents the point of instability when operating with series characteristics; E represents the intersection of curves A and B; F and G represent two points on curve B which are helpful in explaining my invention.

Referring to Fig. 2, 10 represents the alternating current power lines, 11 and 12 respectively represent the primary and secondary of a three phase alternating current commutator motor, the secondary being represented as the rotating element of the motor and consisting of a commutated winding with three brushes resting on the commutator. 13 and 14 respectively represent the primary and secondary of a transformer for energizing the motor secondary 12 when the motor operates with series characteristics; whereas 8 and 9 respectively represent the primary and secondary of a transformer to energize the motor secondary 12 when the motor operates with shunt characteristics. 19 and 20 represent two switches of three-pole, double-throw construction so that they can be closed either in the "right" or "left" positions, both switches preferably being mechanically or electrically connected together so that they will be closed at the same time in either the "right" or "left" positions. For illustrative purposes I have shown the switches mechanically coupled together by the rod 29. If the apparatus operated by the motor requires a high starting torque, the motor is started as a series motor by closing the switches 19 and 20 in the "right" position as shown in Fig. 2. By tracing out the circuits it will be seen that each leg of the primary 11 of the motor is in series with a leg of the transformer primary 13 and the primary windings 11 and 13 are connected as a single winding in mesh to the source 10, the motor secondary is connected to the transformer secondary 14, whereas the transformer secondary 9 is open circuited and the transformer primary 8 is connected to the power lines drawing only magnetizing current, or if desired it can be disconnected from the power lines. It is evident that with these connections, if for example the motor load is increased, the current flowing through the motor secondary 12 will be increased and therefore the current flowing through the transformer primary and secondary 13 and 14 will also increase since they energize the motor secondary 12. Since the motor primary 11 is in series with the transformer primary 13, therefore the motor primary current and the resulting magnetic flux of the machine will vary approximately directly in proportion to the motor secondary current. If the motor load is decreased the reverse will be true. It is evident that with these connections the motor will operate with series characteristics.

Now if the speed of the motor is decreased beyond point D in Fig. 1, the motor becomes unstable in its operation because the torque decreases rapidly. At this point D, or preferably at a slightly higher speed than represented by D, the switches 19 and 20 are operated so as to be disconnected from the "right" position and to be connected in the "left" position. By tracing out the circuits it will be seen that the motor primary 11 is connected in mesh directly across the power lines, the transformer primary and secondary 13 and 14 respectively are open circuited, the transformer primary 8 is connected in mesh directly across the power lines and the motor secondary 12 is connected to the transformer secondary 9. It is evident that as the transformer primary and secondary 13 and 14 are now open circuited and the motor secondary 12 is energized by a different transformer consisting of primary 8 and secondary 9, therefore the current of the motor primary 11 is not affected by the current of the motor secondary 12. It follows that the current and resulting magnetic flux of the motor primary 11 will remain practically constant at all loads and the motor will operate with shunt characteristics and consequent stability of operation. In this manner my novel method of operation combines the advantages of both characteristics. There may be types of apparatus which are most advantageously operated by having the motor driving them start with shunt characteristics and then at some point in the operation change to series characteristics. It is evident that this can be readily accomplished by starting the motor with the switches 19 and 20 closed in the "left" position and at the proper time disconnect the switches 19 and 20 from the "left" position and close them in the "right" position, thus again combining the advantages of both characteristics.

Referring to Fig. 3, 10 represents the alternating current power lines; 11 and 12 respectively represent the primary and secondary of a three phase alternating current commutator motor, the secondary being represented as the rotating element of the motor and consisting of a commutated winding with three brushes resting on the commutator. 13 represents the transformer primary provided with taps 15 and 16; 14 represents the transformer secondary provided with taps 17 and 18. 19, 20 and 21 represent three switches of three-pole, double-throw construction so that they can be closed either in the "right" or "left" positions, the switches preferably being mechanically or electrically connected together so that they will be closed at the same time in either the "right" or "left" positions and for illustrative purposes I have shown the switches mechanically coupled together by the rod 29. 22 represents a movable brush holder yoke for moving the brushes in either direction; 23 represents a connecting lever; 24 represents a lever provided with an elongated slot and a handle; 25 represents a fixed fulcrum point; 26, 27 and 28 represent connecting pins; 30 represents an extension rod rigidly fastened to the rod 29 by pins 31, and rod 30 is provided at its end with several holes drilled close together and of the correct bore to accommodate pin 26. If the apparatus operated by the motor requires a high starting torque then the motor is started by closing the switches 19, 20 and 21 in the "right" position as shown in Fig. 3. By tracing out the circuits it will be seen that each leg of the motor primary 11 is in series with that part of a leg of the transformer primary 13 as represented from its upper ends to the taps 15 and these series connected primary windings are connected in mesh to the source 10, and the motor secondary 12 is connected to that part of the transformer secondary 14 represented from its upper ends to the taps 17. It is evident that with these connections, if for example the motor load is increased, the current flowing in the motor secondary 12 will be increased and therefore the current flowing through the active portions of the transformer primary and secondary 13 and 14 will also be increased since they energize the motor secondary 12. But as the motor primary 11 is in series with the active portion of the transformer primary 13 therefore the motor primary current and resulting magnetic flux of the machine will vary approximately directly in proportion to the motor secondary current. If the motor load is decreased the reverse will be true. It is evident that with these connections the motor will operate with series characteristics.

Now if the speed of the motor is decreased beyond point D in Fig. 1 the motor becomes unstable in its operation because the torque decreases rapidly. At this point, or preferably at a slightly higher speed than that represented by D, the switches 19, 20 and 21 are operated so as to be disconnected from the "right" position and to be connected in the "left" position. By tracing out the circuits it will be seen that the motor primary 11 is not in series with the transformer primary 13 but the motor primary 11 is now connected in mesh directly to the power lines. The complete legs of the transformer primary 13 as represented by the taps 16 are now connected in mesh directly to the power lines in parallel with the primary winding 11, and the motor secondary 12 is connected to the complete legs of the transformer secondary 14 as represented by the taps 18. It is evident that the motor primary 11 is entirely independent of the transformer and therefore the current of the motor primary is not affected by the current of the motor secondary. It follows that the current and resulting magnetic flux of the motor primary will remain practically constant at all loads and the motor will operate with shunt characteristics and consequent stability. In this manner my novel method of operation and my novel circuit arrangement combines the advantages of both characteristics with the advantage of using the same voltage changing means in both characteristics. There may be types of apparatus which are most advantageously operated by having the motor driving them start with shunt characteristics and then at some point in the operation change to series characteristics. It is evident that this can be readily accomplished by starting the motor with the switches 19, 20 and 21 closed in the "left" position and at the proper time disconnect the switches 19, 20 and 21 from the "left" position and close them in the "right" position, thus again combining the advantages of both characteristics with the advantage of using the same voltage changing means.

It is desirable to make the change over from series to shunt characteristics and vice versa without shutting down the motor or otherwise interfering with the apparatus and with as little current impulse as possible. This can be accomplished by making the change over when the motor is operating at a speed represented by point E in Fig. 1. At this point curves A and B intersect and the speeds and torques of both curves are the same and there should be no current impulse. But it is often desirable to make the change over at some other point as for example at D in Fig. 1. If this is done without shifting the brushes the motor will momentarily operate at point G on curve B in Fig. 1 and this will result in a current impulse because of the higher torque at the constant speed. The current will subside as the torque is lowered to the value F which corresponds to the value it had before the change over was made. But the current impulse can be kept to very small values by shifting the brushes so that the motor will have the shunt characteristics as represented by curve C in Fig. 1 at the same time the change over is made because at D the curves A and C coincide and their speeds and torques are the same. This result my invention accomplishes by the brush shifting mechanism illustrated in Fig. 3. The length of the levers are so adjusted that when the switches 19, 20 and 21 are moved from the "right" to the "left" positions the brushes will be moved the proper amount. Assuming the rod 29 moves in a horizontal line and since lever 24 moves around a fixed fulcrum point 25, therefore I make the lever 24 with an elongated slot to prevent binding. If it is desired to shift the brushes by hand at any part of the operation this can be accomplished by removing pin 26 and moving the lever in the proper direction. The pin 26 can then be replaced in the nearest hole in rod 30 that coincides with the elongated slot in lever 24 and the mechanism is in condition to be moved by the rod 30 at the same time the change over is taking place.

While I have described my invention in connection with a three-phase, alternating current commutator motor having a stationary primary and a revolving secondary with three brushes on the commutator, with the motor and transformer primaries connected in mesh, with the transformer secondaries connected in star and with mechanically coupled together switches, yet it is evident that these are only illustrative and that my invention is equally applicable irrespective of; which member of the machine is rotatable and the number of brushes resting on the commutator, the number of phases, the method of connection employed in the motor primary and the transformer windings and whether the switches are mechanically, electrically or otherwise coupled together, and therefore I do not wish to limit my invention to the particular means described. Also, while I have described my invention in connection with transformers as the voltage changing means and a system of levers to move the brushes, yet it is evident that these were only illustrative and that my invention is equally applicable irrespective of the voltage changing means and brush shifting means employed.

In accordance with the provisions of the patent statutes I have described the principles of operation of my invention, together with the apparatus which I now consider to represent the best embodiment thereof, but I desire to have it understood that such other modifications as fall fairly within the true spirit and scope of my invention are intended to be included within the scope of the appended claims.

What I claim as new and desire to secure by Letters Patent of the United States is:

1. In combination, a source of alternating current supply, an alternating current motor having a stationary winding and a commutated rotor winding, a voltage changing device and switching means having two operating positions, one for connecting said voltage changing means in series relation between said stationary and commutated windings and the other for connecting said voltage changing means between said source of supply and commutated winding.

2. In combination, a source of alternating current supply, a motor having relatively rotatable windings, one of which is a commutated winding, a voltage changing device through which said commutated winding is supplied, and switching means for connecting said voltage changing device between said windings or directly between said source of supply and commutated winding.

3. In combination, a source of alternating current supply, a motor having a primary winding and a commutated secondary winding, adjustable brushes associated with said commutated winding, a voltage changing device through which said commutated winding is supplied, switching means having two operating positions, one for connecting said voltage changing means between said windings to obtain series operating characteristics and the other for connecting said voltage changing means directly between the source of supply and the commutated winding to obtain shunt operating characteristics, and interlocking means between said switching means and adjustable brushes whereby said brushes are moved to a desired position when such change in connections is made.

4. In combination, a source of alternating current, an alternating current motor having relatively rotatable primary and commutated windings, connecting means between said primary winding and said source, a transformer, and switching means adapted to be closed in either of two operating positions, one of said operating positions for connecting said transformer between said primary winding and said commutated winding so that the latter is energized from said source in series relationship with said primary winding, and the other of said operating positions for connecting said commutated winding so that the latter is energized from said source in parallel relationship with said primary winding.

5. In combination, a source of alternating current, an alternating current commutator type motor having relatively rotatable primary and commutated windings, movable brushes on said commutator, connecting means for energizing said primary winding from said source, switching means having one operating position for connecting said commutated winding so that the latter is energized from said source in series relationship with said primary winding, and another operating position for connecting said commutated winding so that the latter is energized from said source in parallel relationship with said primary winding, means for moving said switching means from one to the other of said operating positions, and interlocking means between said switching means and said movable brushes for simultaneously moving the latter a predetermined amount when the switching means are moved from one to the other of said operating positions.

6. In combination, an alternating current motor having a stationary winding and a rotatable commutated winding, a transformer having primary and secondary windings, a second transformer having primary and secondary windings, and switching means adapted to be closed in either of two operating positions, one of said operating positions for connecting the primary and secondary windings of the second mentioned transformer in series relationship between the stationary and rotatable commutated windings of said motor, and the other of said operating positions for connecting said rotatable commutated winding to the secondary winding of the first mentioned transformer.

7. In combination, a source of alternating current, an alternating current motor having a stationary winding and a rotatable commutated winding, connecting means between said stationary winding and said source, a transformer having primary and secondary windings provided with taps so that different predetermined portions of said primary and secondary windings may be employed, and switching means having two operating positions, one of said operating positions for connecting a predetermined portion of said primary winding in series with said stationary winding and connect a predetermined portion of said secondary winding to said commutated winding, and the other of said operating positions for connecting a different predetermined portion of said primary winding directly to said source and connect a different predetremined portion of said secondary winding to said commutated winding.

8. The method of operating an alternating current commutator motor from a source of alternating current, the motor having a primary winding, a commutated winding and movable brushes resting on the commutator, which consists in connecting the primary and commutated winding in series relationship with each other for energization by the source during a predetermined portion of the motor operating speed range, reconnecting the primary and commutated windings in parallel relationship with each other for energization by the source during another part of the motor operating speed range, and simultaneously with said reconnection moving the brushes on the commutator in the proper direction and the proper amount so that the speed adjustment of the motor immediately after the reconnection is substantially the same as the speed adjustment before the reconnection was made.

9. The method of operating an alternating current commutator motor from a source of alternating current, the motor having a primary winding, a commutated winding and movable brushes resting on the commutator, which consists in changing the connections of the primary and commutated windings from a series relationship connection to the source to a parallel relationship connection to the source and vice versa at a desired torque of the motor, and simultaneously with this reconnection of the primary and commutated windings to the source moving the brushes on the commutator in the proper direction and the proper amount so that the speed adjustment of the motor immediately after the reconnection is substantially the same as the speed adjustment before the reconnection was made.

In witness whereof I have hereunto set my hand this 19th day of July, 1929.

WALTER SEIZ.